United States Patent
Khan et al.

(10) Patent No.: US 12,355,836 B2
(45) Date of Patent: Jul. 8, 2025

(54) PRIVATE LINK BASED ACCESS WITH PORT MAPPING FOR SERVICE DEPLOYED IN A SEPARATE CLOUD

(71) Applicant: Oracle International Corporation, Redwood Shores, CA (US)

(72) Inventors: Feroz Alam Khan, Bangalore (IN); Srinivas Pamu, Bengaluru (IN); Prasanna Ramamurthi, Chennai (IN); Kant Patel, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/211,172

(22) Filed: Jun. 16, 2023

(65) Prior Publication Data
US 2024/0422215 A1    Dec. 19, 2024

(51) Int. Cl.
| | |
|---|---|
| *H04L 67/101* | (2022.01) |
| *H04L 45/745* | (2022.01) |
| *H04L 47/125* | (2022.01) |
| *H04L 67/563* | (2022.01) |
| *H04L 67/63* | (2022.01) |

(52) U.S. Cl.
CPC .......... *H04L 67/101* (2013.01); *H04L 45/745* (2013.01); *H04L 47/125* (2013.01); *H04L 67/563* (2022.05); *H04L 67/63* (2022.05)

(58) Field of Classification Search
CPC ..... H04L 67/101; H04L 67/563; H04L 67/63; H04L 45/745; H04L 47/125
See application file for complete search history.

(56) References Cited

U.S. PATENT DOCUMENTS

| | | | |
|---|---|---|---|
| 7,673,056 B1 * | 3/2010 | Inbaraj | H04L 67/563 |
| | | | 709/227 |
| 9,253,206 B1 * | 2/2016 | Fleischman | H04L 63/1458 |
| 9,300,633 B2 | 3/2016 | Acharya et al. | |
| 10,110,500 B2 | 10/2018 | Kore et al. | |
| 10,257,033 B2 * | 4/2019 | Shimamura | H04L 41/145 |
| 11,750,568 B1 * | 9/2023 | Rasekh | H04L 67/10 |
| | | | 726/1 |
| 2017/0244593 A1 * | 8/2017 | Rangasamy | H04L 67/1097 |
| 2018/0123964 A1 * | 5/2018 | Kore | H04L 41/5009 |
| 2018/0270201 A1 * | 9/2018 | Chanak | H04L 9/14 |
| 2020/0028758 A1 * | 1/2020 | Tollet | H04L 45/586 |
| 2021/0382761 A1 * | 12/2021 | Bai | H04L 41/5041 |

(Continued)

FOREIGN PATENT DOCUMENTS

| | | |
|---|---|---|
| CN | 105979009 B | 5/2019 |
| WO | WO2019/014048 A1 | 1/2019 |

OTHER PUBLICATIONS

"SAP BTP Connectivity," SAP, Public doc, dated Jun. 14, 2023.

(Continued)

*Primary Examiner* — Glenton B Burgess
*Assistant Examiner* — Jihad K Boustany
(74) *Attorney, Agent, or Firm* — Vista IP Law Group, LLP

(57) ABSTRACT

Some embodiments are directed to an improved approach to implement deployments where a client can get application-level redirects to different servers, where the service is running in a different cloud environment. Dynamic port mapping may be performed at runtime. Routes may be added to IP tables to implement redirects from a first cloud to a second cloud.

21 Claims, 17 Drawing Sheets

(56) References Cited

U.S. PATENT DOCUMENTS

| | | | | |
|---|---|---|---|---|
| 2022/0029989 | A1* | 1/2022 | Mathur | G06F 21/606 |
| 2022/0141189 | A1* | 5/2022 | Flavel | H04L 63/0272 |
| | | | | 726/15 |
| 2023/0078546 | A1* | 3/2023 | Sun | H04L 67/51 |
| | | | | 709/223 |

OTHER PUBLICATIONS

"Access services in a VPC that belongs to another account," Alibaba Cloud, URL: https://www.alibabacloud.com/help/en/doc-detail/174059.htm, last updated Jan. 12, 2023.

"Packet Translation and GRE Tunneling," Juniper Networks, URL: https://www.juniper.net/documentation/us/en/software/junos/interfaces-adaptive-services/topics/topic-map/packet-translation-gre-tunnel-vpn.html, dated Jun. 25, 2021.

"Understanding Mapping of Address and Port with Encapsulation (MAP-E)," Juniper Networks, URL: https://www.juniper.net/documentation/us/en/software/junos/interfaces-adaptive-services/topics/concept/map-e-overview.html, dated Nov. 16, 2022.

"Private Link," Azure Microsoft, URL: https://azure.microsoft.com/en-us/products/private-link/#overview, date found via Google as Sep. 16, 2022.

"Azure Private Link & Snowflake," Snowflake Documentation, URL: https://docs.snowflake.com/en/user-guide/privatelink-azure.html, date found via Google as May 21, 2021.

"What is AWS PrivateLink?," AWS, URL: https://docs.aws.amazon.com/vpc/latest/privatelink/endpoint-services-overview.html, date found via Google as Jan. 6, 2020.

"AWS PrivateLink," AWS, URL: https://docs.aws.amazon.com/whitepapers/latest/building-scalable-secure-multi-vpc-network-infrastructure/aws-privatelink.html, date found via Google as Nov. 15, 2019.

"Private Service Connect," Google Cloud, URL: https://cloud.google.com/vpc/docs/private-service-connect, date found via Google as Apr. 10, 2023.

Sharma, T., "Dynamic Port Mapping in ECS with Application Load Balancer," ToTheNew Blog, URL: https://www.tothenew.com/blog/dynamic-port-mapping-in-ecs-with-application-load-balancer/, dated Jan. 24, 2017.

* cited by examiner

PRIVATE LINK BASED ACCESS WITH PORT MAPPING FOR SERVICE DEPLOYED IN A SEPARATE CLOUD

BACKGROUND

In a cloud computing environment, computing systems may be provided as a service to customers. One of the main reasons for the rising popularity of cloud computing is that the cloud computing model typically allows customers to avoid or minimize both the upfront costs and ongoing costs that are associated with maintenance of IT infrastructures. Moreover, the cloud computing paradigm permits high levels of flexibility for the customer with regards to its usage and consumption requirements for computing resources, since the customer only pays for the resources that it actually needs rather than investing in a massive data center infrastructure that may or may not actually be efficiently utilized at any given period of time.

The cloud resources may be used for any type of purpose or applicable usage configuration by a customer. For example, the cloud provider might host a large number of virtualized processing entities on behalf of the customer in the cloud infrastructure. The cloud provider may provide devices from within its own infrastructure location that are utilized by the cloud customers. In addition, the cloud provider may provide various services (e.g., database services) to customers from the cloud. As yet another example, the cloud provider may provide the underlying hardware device to the customer (e.g., where the device is located within the customer's own data center), but handle implementation and administration of the device as part of the cloud provider's cloud environment.

A customer may choose to implement any suitable set of components/services within its own virtual cloud environment. For example, a cloud customer may choose to implement an on-premises database server and/or a private endpoint/service within its virtual cloud environment. A cloud provider may similarly choose to implement its customer-facing components within its own virtual cloud environment. For example, a cloud provider may become a service provider that offers a cloud-based database service as a service from its own virtual cloud environment. A notable example of a cloud-based database is the Oracle Autonomous Database, which is available from Oracle Corporation. The Oracle Autonomous Database is an autonomous data management product in the cloud that provides automated patching, upgrades, tuning, and database maintenance tasks while the system is running, without human intervention. This autonomous database cloud product is self-managing, self-securing, and self-repairing, which helps to eliminate manual database management and human errors.

There is often a need for secure and efficient communications to occur between the various virtual cloud environments. A component or service within a customer's private virtual cloud environment may need to communicate with a service or component within a cloud provider's virtual cloud environment. For example, a client in customer/user tenancy in a first cloud environment may need to communicate with services or resources in a second cloud environment.

One way to accomplish this is to establish a "private link" for the customer. Various cloud services present an abstraction of private link where a different cloud service is exposed to the customer as a private IP in its own subnet. In many multi-cloud solutions, the cloud service is deployed in a different cloud and serviced by multiple servers. At runtime the connection can get redirected to a different server, while the client should be able to continue to access the service using the same private link IP.

In the database context, multiple instances of a clustered database may be offered for the same service in a cloud environment, and a client connection may be provided through a private link to access those database services. Since there are multiple instances that can be reached by the customer, a load balancer may be used to balance the load across the backend servers at runtime.

This means that the same private link can be used to access any number of the remote resources, where the remote resources essentially appear as a "black box" to the client. From the client's perspective, the only visibility is that communications are sent to the specific IP address associated with the private link, but at the backend resources, that private link IP address for a first workload may end up being associated with a first backend resource depending upon the algorithms employed by the load balancer, while second workload for that same private link is associated with a second and different backend resource. This makes it very difficult to adequately manage and track the way the client can communicate with the backend resources.

Therefore, there is a need for an improved approach to implement a solution that addresses the issues identified above.

SUMMARY

Some embodiments are directed to an improved approach to implement deployments where a client can obtain application-level redirects to different servers, where the service is running in a different cloud environment.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Some embodiments are directed to an improved approach to implement deployments where a client can get application-level redirects to different servers, where the service is running in a different cloud environment.

Figure 1:
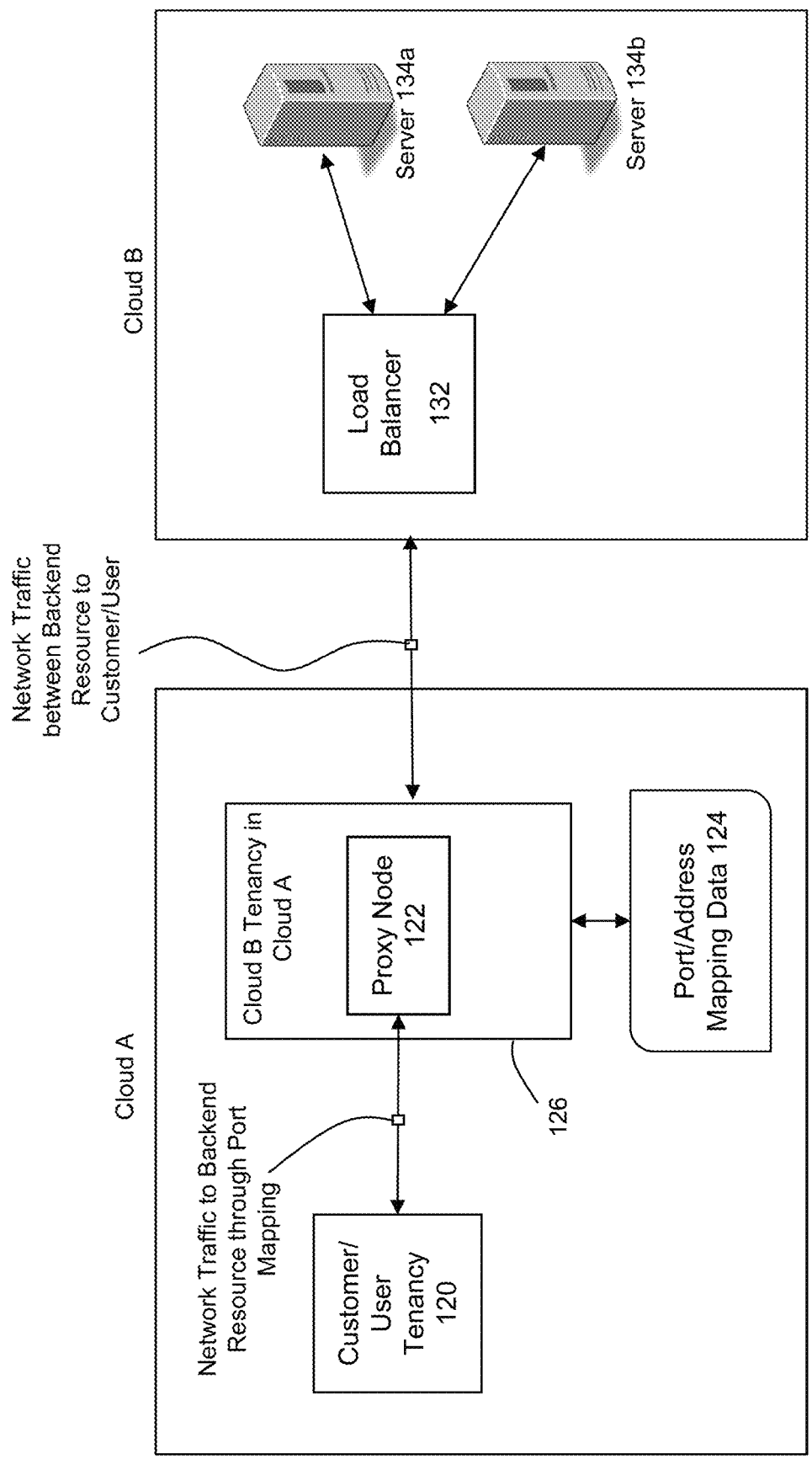
FIG. 1 provides an illustration of the invention according to some embodiments of the invention.

FIG. 1 provides an illustration of the invention according to some embodiments. This figure shows a cloud-based computing system that includes a first cloud environment (Cloud A) and a second cloud environment (Cloud B). A customer/user tenancy 120 exists within Cloud A. The concept of a "tenancy" in a cloud context refers to the use of a shared set of computing assets in a cloud environment, where the portion of the shared resources allocated to or accessed by a customer tenant is applied in a manner that makes the resource usage isolated and protected from other tenants. Within the cloud tenancy, a user/customer may be associated with a set of resources that manifest as clients, servers, applications, services, machines, devices, etc. Cloud environments A and/or B may correspond to any type of cloud-based computing environment that may be suitably applied to the invention, include a private cloud environment, a public cloud environment, or an on-premises environment.

A client within the customer tenancy 120 in Cloud A may seek to access resources located within Cloud B, such as services that may be running on servers 134*a* or 134*b*. Any type of services may be deployed in Cloud B for access by the client in Cloud A. As just one possible example, Cloud B may be embodied as the Oracle Cloud for database services, such as the Exadata Cloud Service (ExaCS) and the Oracle Autonomous Database (ATP-D), where multiple instances of a clustered database are offering the same service, and client connections are load balanced across these servers transparently at runtime. A load balancer 132 exists in Cloud B to perform load balancing for the services/database instances running on servers 134*a* and 134*b*.

The customer at Cloud A may choose to use a private link to access the services at Cloud B. A private link permits a cloud service in a different cloud to be is exposed to the customer as a private IP in its own subnet. Numerous approaches may be used to implement the private link. In some embodiments, a private endpoint is employed, where the private endpoint corresponds to a network interface that uses a private IP address from the customer's virtual network. The network interface connects the client in the tenancy to a remote service. In effect, the private endpoint allows the service to be brought into the customer's virtual network. The customer virtual network may include one or more components managed and/or operated by or for the customer. For example, the customer virtual network may include clients, as well as "on-prem" or local instances of databases or database applications. It is noted that the invention is not limited only to database-related systems and applications, and indeed, the customer resources in Cloud A and/or the backend resources in Cloud B may pertain to any type of computing resource or service.

In the architecture of FIG. 1, a client request from Cloud A is directed to a service using a private link IP address that is associated with the customer's subnet. However, the inventive approach of the present embodiment uses an application-level redirect process to direct the communications to different servers/services running in Cloud B. The approach is generally implemented by having a different port for every backend IP address, and then redirecting the client to the same private link IP and different port and all traffic on that port is now forwarded to backend server and same for reverse traffic. A cloud tenancy 126 within Cloud A may include a proxy node 122 to effect this redirect process. Each server 134*a* or 134*b* is associated with a distinct port number and IP address combination in Cloud B. The proxy node 122 maintains mapping data 124 that maps port numbers to addresses.

Figure 2:
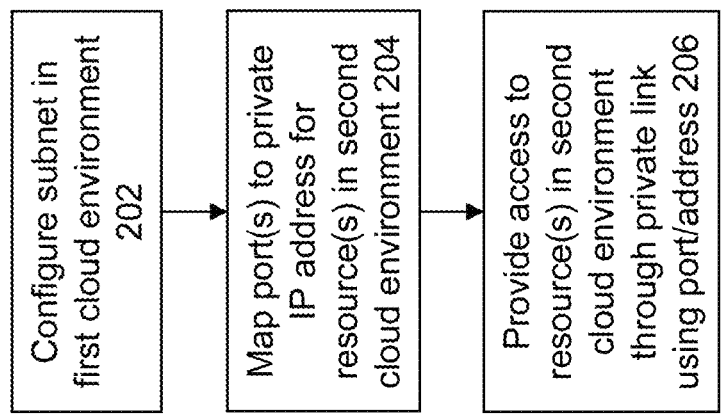
FIG. 2 shows a high level flowchart of the invention according to some embodiments.

FIG. 2 shows a high-level flowchart of the invention according to some embodiments. At 202, a private link is configured that is associated with a subnet in the first cloud environment. The private link may be associated with any private subnet from the virtual network for the client. A "subnet" is a segmented portion of a larger network, and sometimes considered a network within a larger network. This permits logically isolated portions of the network space to be formed and purposefully defined from the larger network. Many systems and cloud vendors use subnetting to form virtual private cloud resources or clouds from a larger collection of cloud resources. In some cases, a virtual cloud network (or virtual private cloud) can be formed to resemble the traditional network of on-premises architectures, where subnets can be formed once the private cloud environment is created. The subnet would then correspond to a range of IP addresses within the virtual network.

At 204, ports associated with specific backend resources are mapped to IP addresses, and these mappings are maintained by a proxy at the client's cloud environment. These mapping are used to perform redirects of communications from the first cloud environment to the second cloud environment in a pinpoint manner to specifically identify individual ones of the backend resources. In this way, even if the second cloud environment is normally opaque to the first cloud environment, the mapping data permits the re-direction of communications to be forwarded to the correct backend resource.

At 206, access to the backend resource is provided through the private link in a manner that permits communication to be directed to specific resources in the second cloud. By checking against the mapping data for the ports/addresses, this permits the proxy to intelligently direct communications to the correct backend resource.

Figure 3:
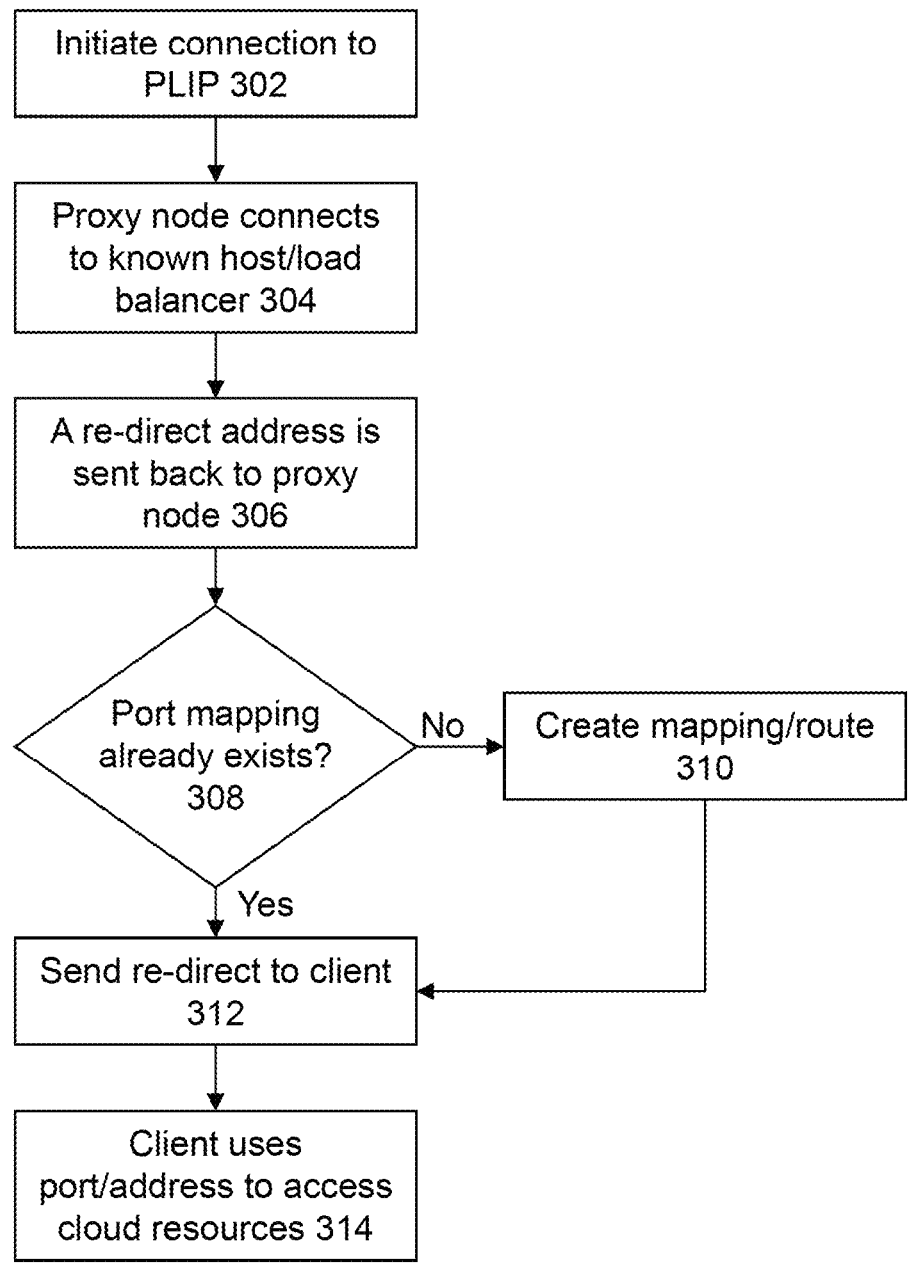
FIG. 3 shows a more detailed flowchart according to some embodiments of the invention.

FIG. 3 shows a more detailed flowchart according to some embodiments of the invention. At 302, the client initiates a connection to private link IP (PLIP). The communication may be initiated using a standard port. As noted above, the PLIP corresponds to a subnet within the customer virtual network.

At 304, the proxy node process will then connect to a known host port that knows the topology of the cloud service and based on the customer's requests, will send the application redirect to an appropriate server. In some embodiments, the communication is sent to the load balancer at the second cloud environment, and the load balancer will select the appropriate backend resource according to a policy or rule configured for the load balancer. For example, the load balancer may employ an algorithm such as a round robin approach to assign work to a backend server, or may select the server having the lowest current load levels.

At 306, the load balancer will send back a redirect to the proxy node in the first cloud environment. The redirect address provided to the proxy will include the port number of the selected server/service at the second cloud environment.

At 308, the proxy node process will check if it has a mapped port for the redirect address. It is noted that the current approach supports usage in a dynamically changing cloud environment. Therefore, it is possible that the configuration of the second cloud environment may change, which may result in the inclusion of new servers or the removal of existing servers from the cloud environment. As such, it is possible that the redirect address may pertain to a port number for a server that was not previously known to the proxy node.

If the port number was not previously mapped, then at 310, that port number is mapped in the mapping data structure, and the procedure then goes to step 312. If the port mapping already exists, then step 310 is bypassed and the procedure directly goes to step 312. At 312, the redirect is sent to the client. Thereafter at 314, the client will use the selected port/address to send further communications to the proxy node. The proxy node will use that node/address to direct communications to the selected server/service at the second cloud environment.

Figure 4A:
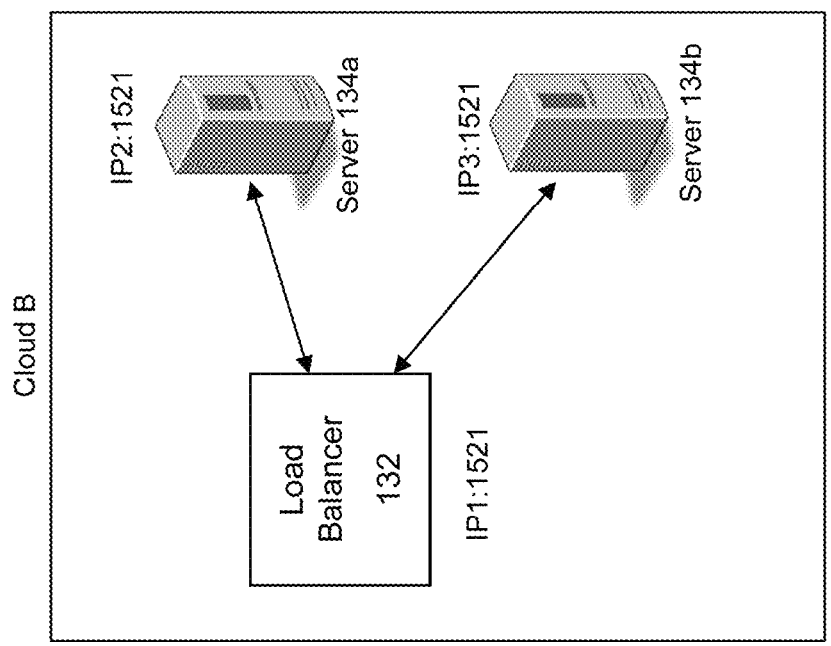
FIGS. 4A-I provide an illustrative example of these processing steps according to some embodiments of the invention.
Figure 4A:
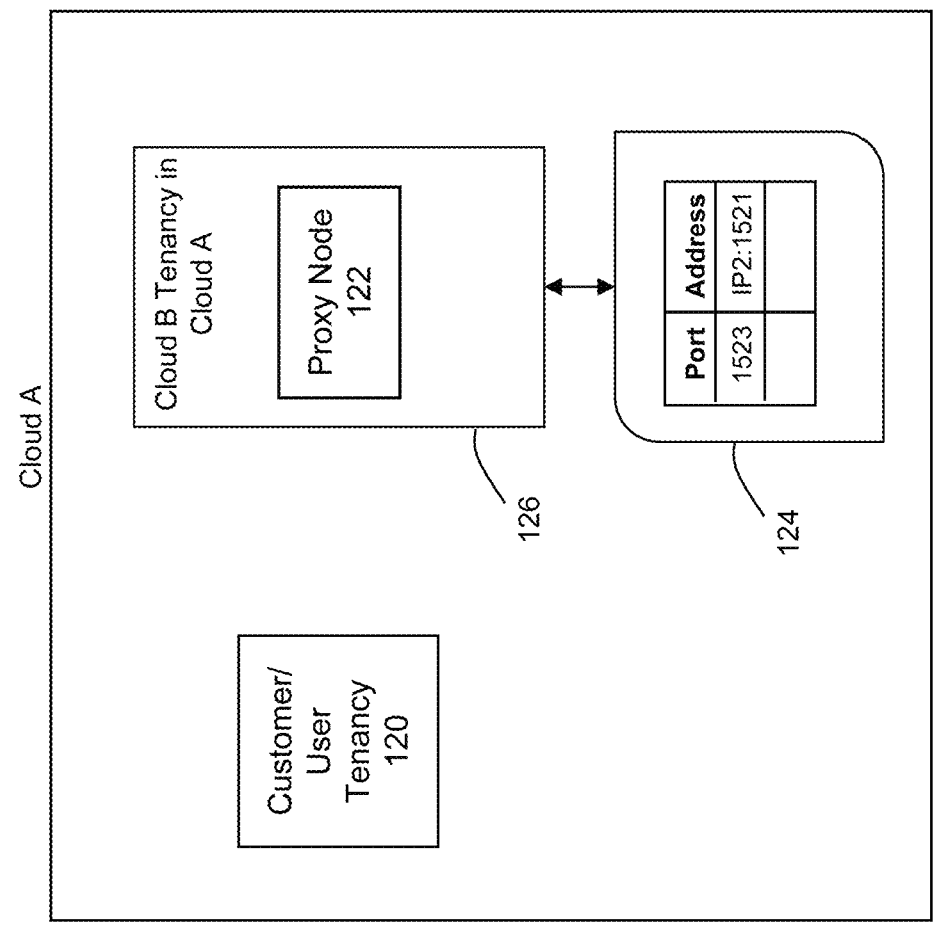

FIGS. 4A-I provide an illustrative example of these processing steps according to some embodiments of the invention. FIG. 4A reproduces the configuration of a client in a customer tenancy 120 in Cloud A that seeks to access a service in Cloud B. Within Cloud B, the load balancer is associated with the address IP1:1521. A first backend server 134a is associated with the address IP2:1521 and the second backend server 134b is associated with the address IP3:1521.

A mapping table 124 is maintained by the proxy node 122. The mapping table 124 includes a plurality of rows, with each row associated with a port/address mapping. Each row includes at least two columns, with a first column holding a port value and a second column holding an address value.

At the current moment, the mapping table includes only a single entry for the mapping of port 1523 with address IP2:1521. This port/address mapping corresponds to server 134a in Cloud B. At present, there is no mapping for server 134b in the mapping table 124. There are many possible reasons for this. For example, server 134b may have been recently added as a new resource for Cloud B. Another possible reason is that the load balancer 132 had not previously assigned any work to server 134b that necessitated an entry in the mapping table 124.

Figure 4B:
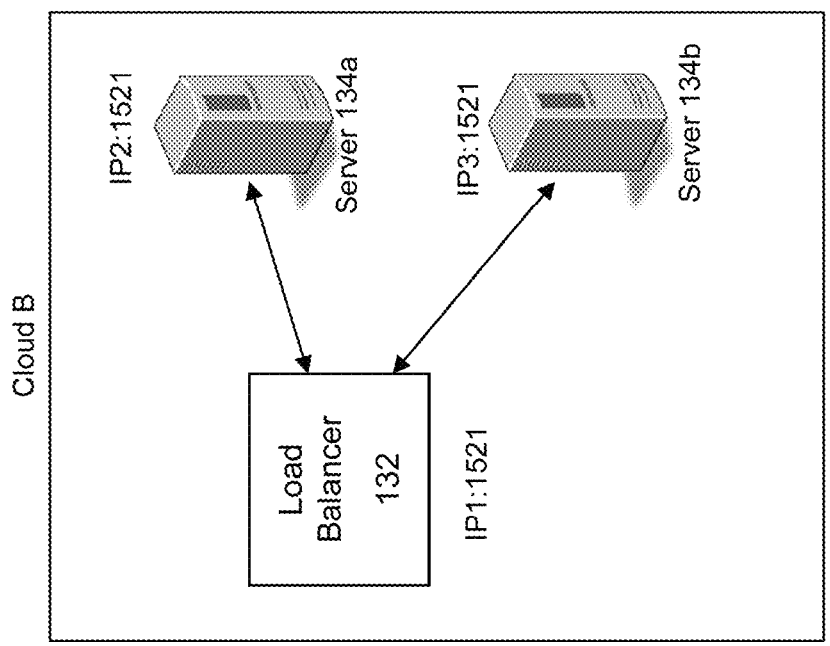
Figure 4B:
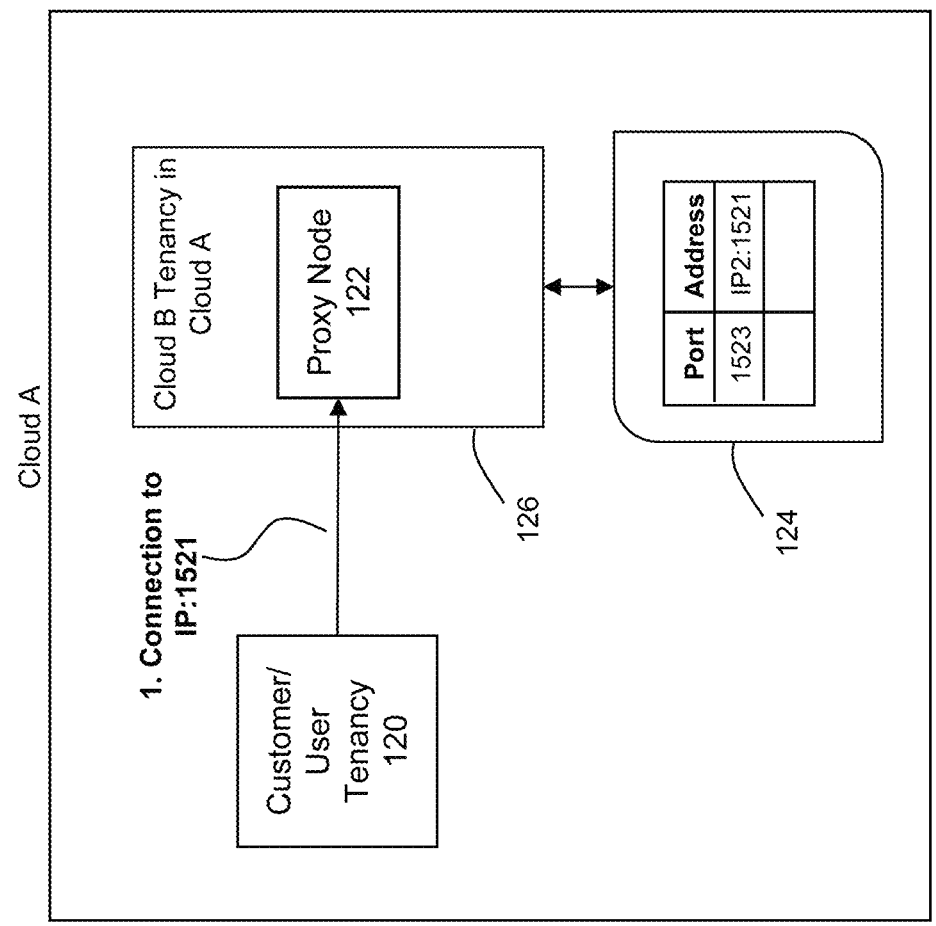

FIG. 4B provides an illustration of when (at step 1) the customer initiates a connection to the PLIP at a standard port. In the current situation, the communication is directed to address IP:1521. This communication is directed to the proxy node 122 for further redirection.

Figure 4C:
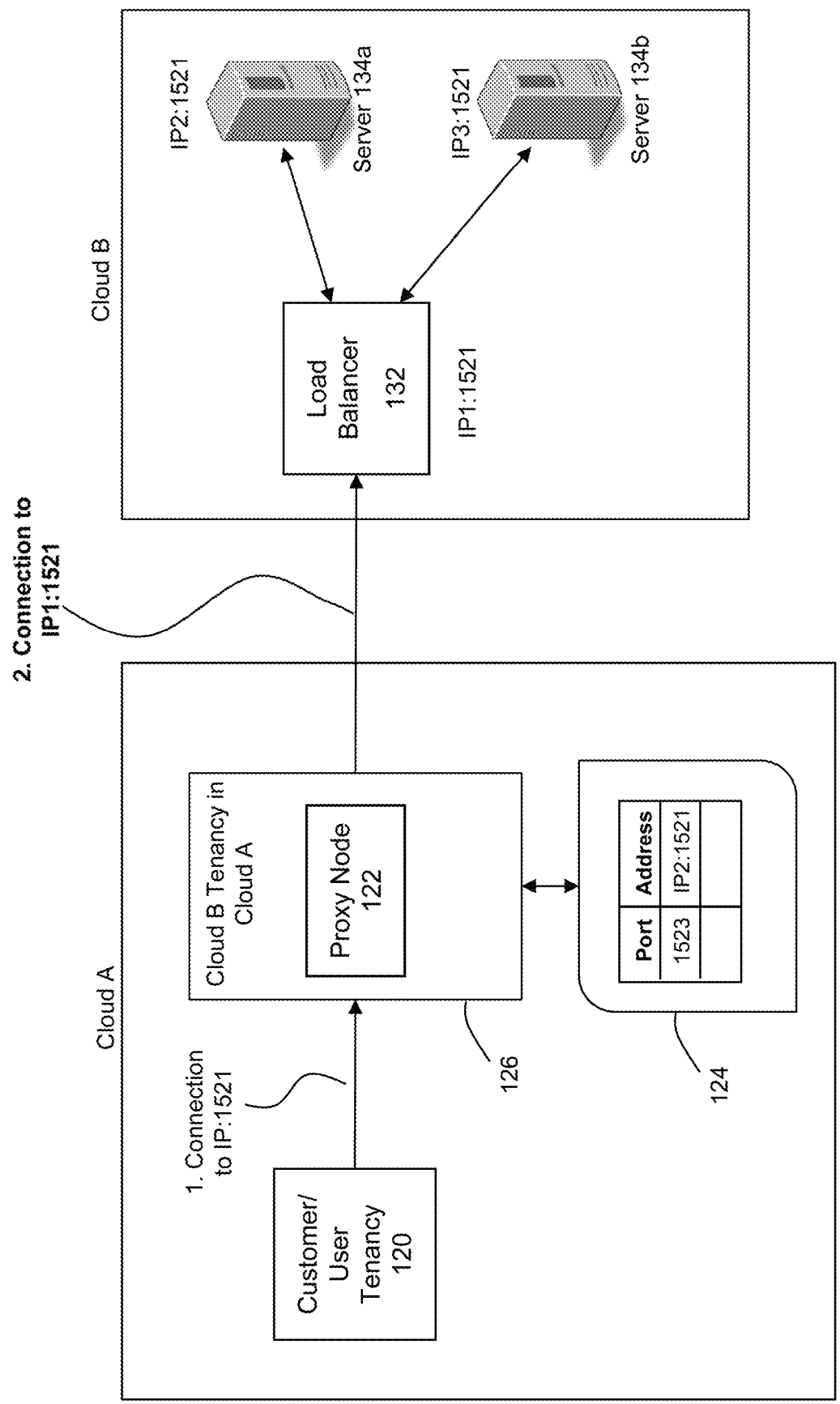

As shown in FIG. 4C (at step 2), the proxy node 122 will then connect to a known host port, which in the current situation is the load balancer at IP1:1521. The load balancer at IP1:1521 knows the topology of cloud service at Cloud B, and based on the customer's requests, will send an application redirect to an appropriate server.

Figure 4D:
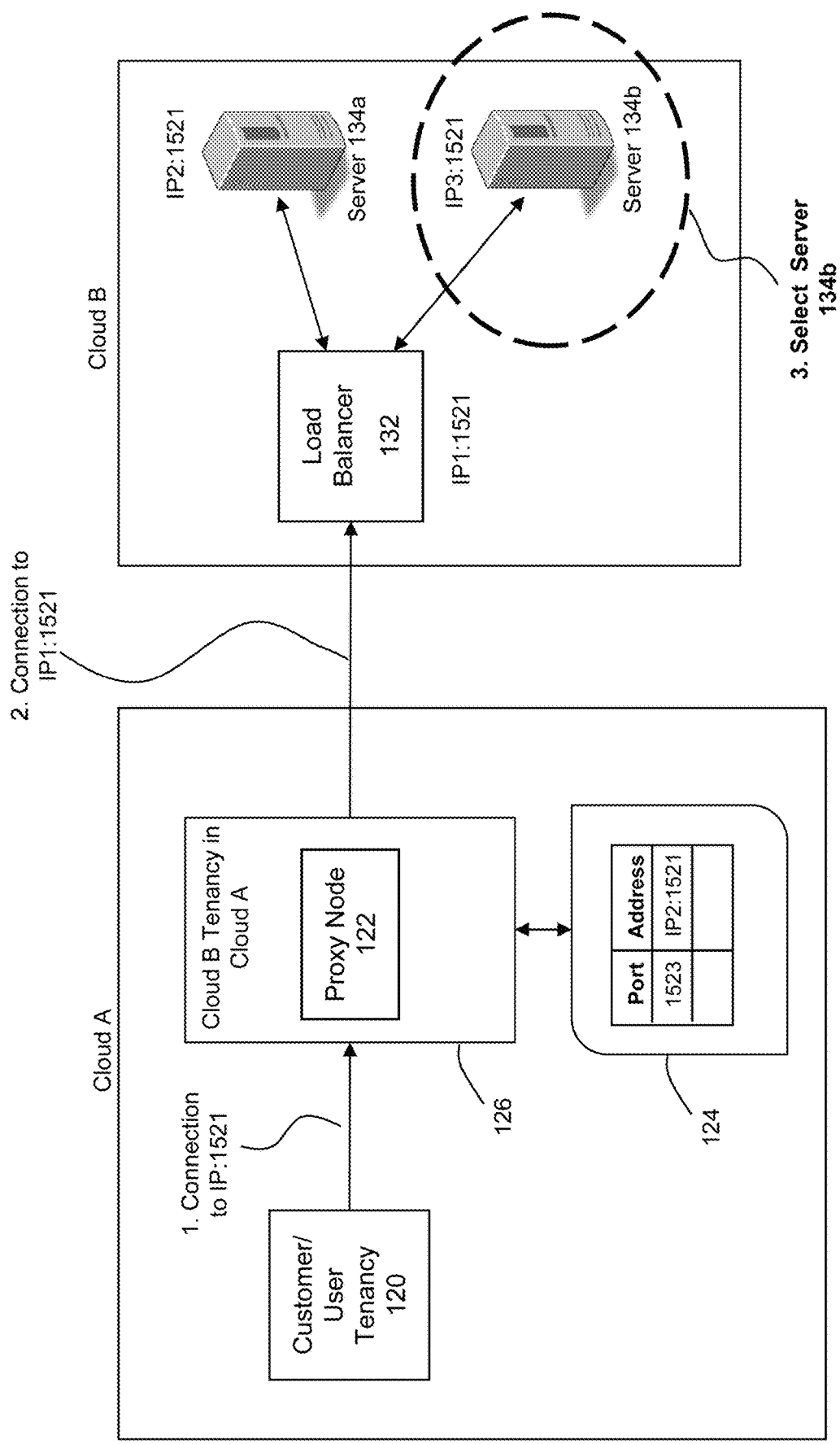

In the current example, as shown in FIG. 4D (step 3), server 134b has been selected as the most appropriate server to handle the workload for the customer request. The load balancer may have chosen server 134b for any number of reasons. For instance, it is possible that server 134b was chosen on the basis of having less utilization than any other server/service at Cloud B. Such utilization may be measured using any appropriate metric(s), including for example, memory utilization, CPU utilization, number of network connections, network bandwidth, request time handling metrics, and/or any combination of different metrics.

Figure 4E:
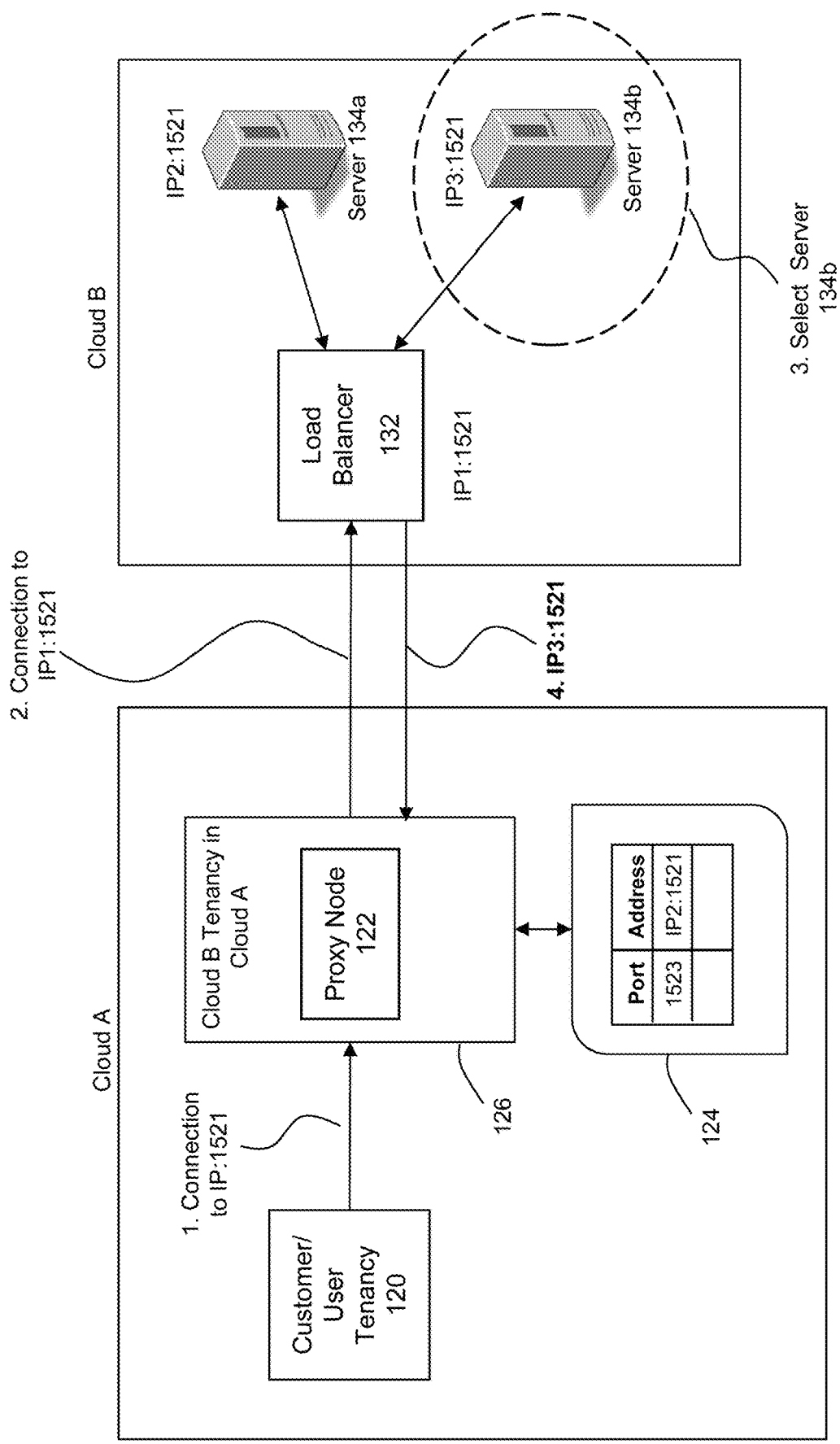

Based on the selection of server 134b, as shown in FIG. 4E (step 4), the load balancer at IP1:1521 will send a redirect to the proxy node, where the redirect address is specified to be the address of the selected server 134b. In particular, the redirect address of IP3:1521 will be sent to the proxy node 122.

Figure 4F:
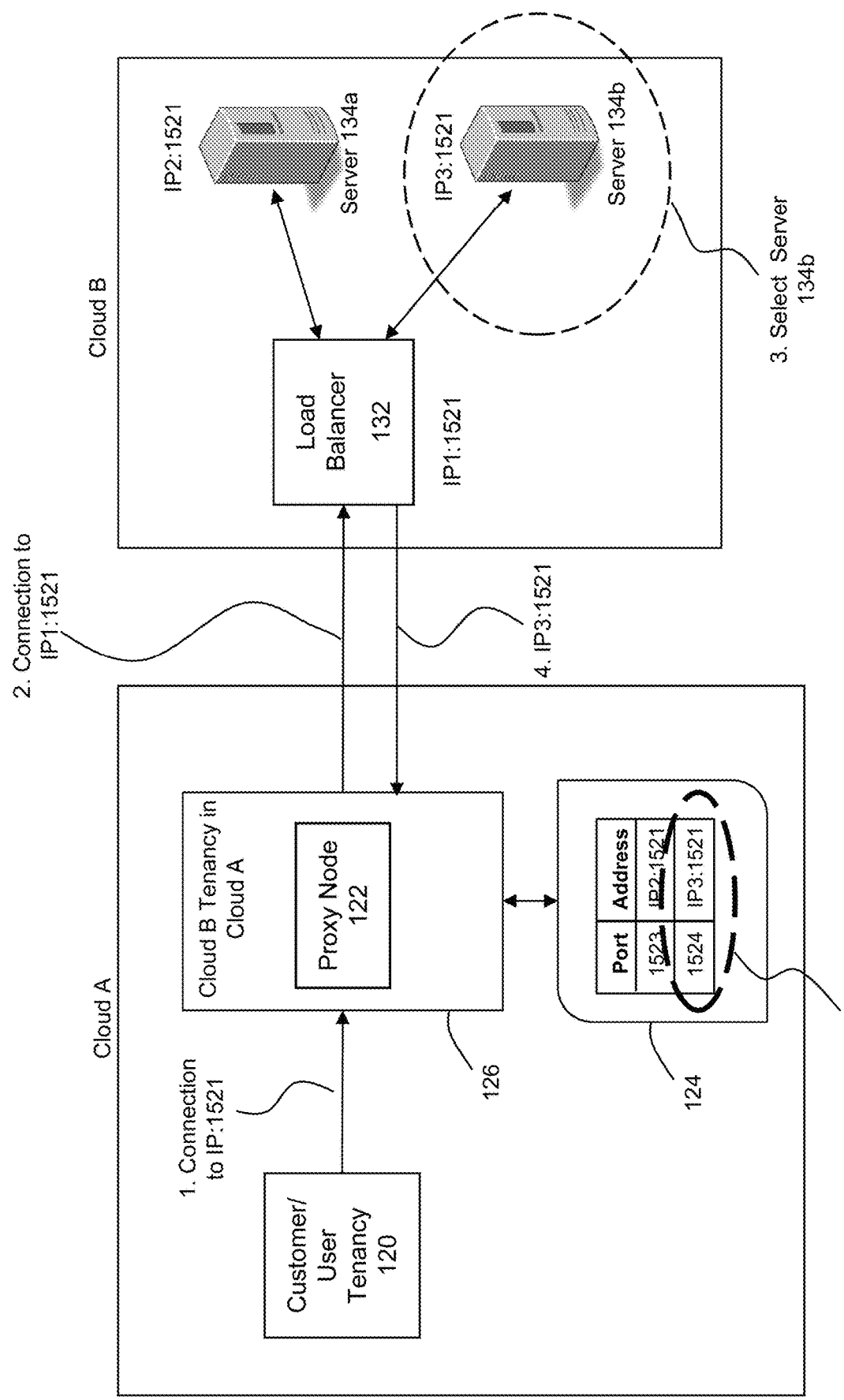

The proxy node will then check if there is a mapped port for IP3:1521 in the mapping table 124. If not, then as shown in FIG. 4F (step 5), an entry is created for this address in the mapping table. The new entry will also include a port number (1524) that is associated with the address IP3:1521.

It is noted that when creating the new entry in the mapping table, the proxy node may also create a route so that traffic on port 1524 is forwarded to IP3:1521. An IP table or a route table may be maintained for the routes created by the proxy node. These tables are used to determine where network traffic from a subnet or endpoint will be directed when received at the proxy node.

Figure 4G:
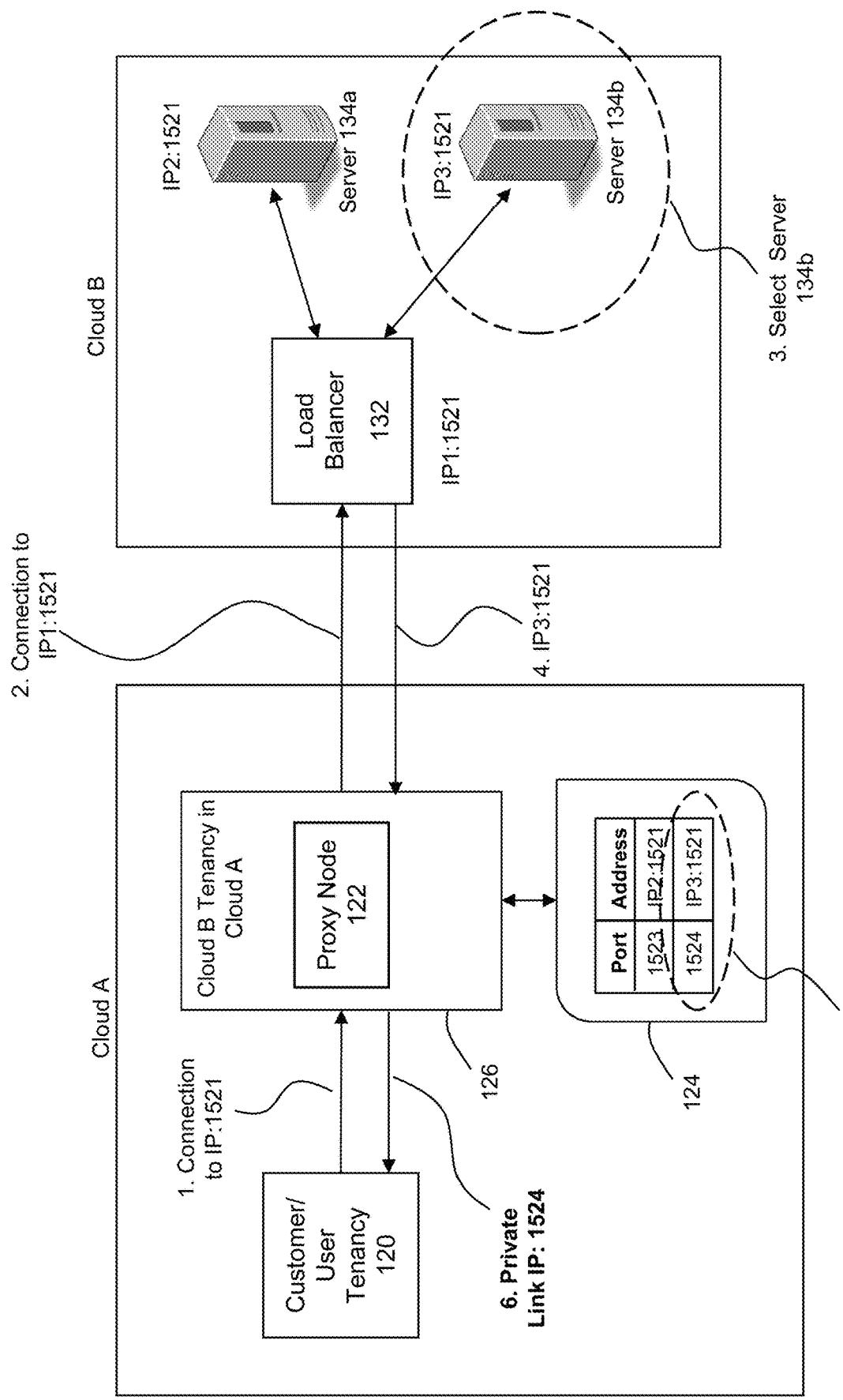

As shown in FIG. 4G (step 6), the proxy node process will then send a redirect to the client to connect on PLIP and port 1524. This will make the client aware that future communications for the selected backend resource should be directed to port 1524.

Figure 4H:
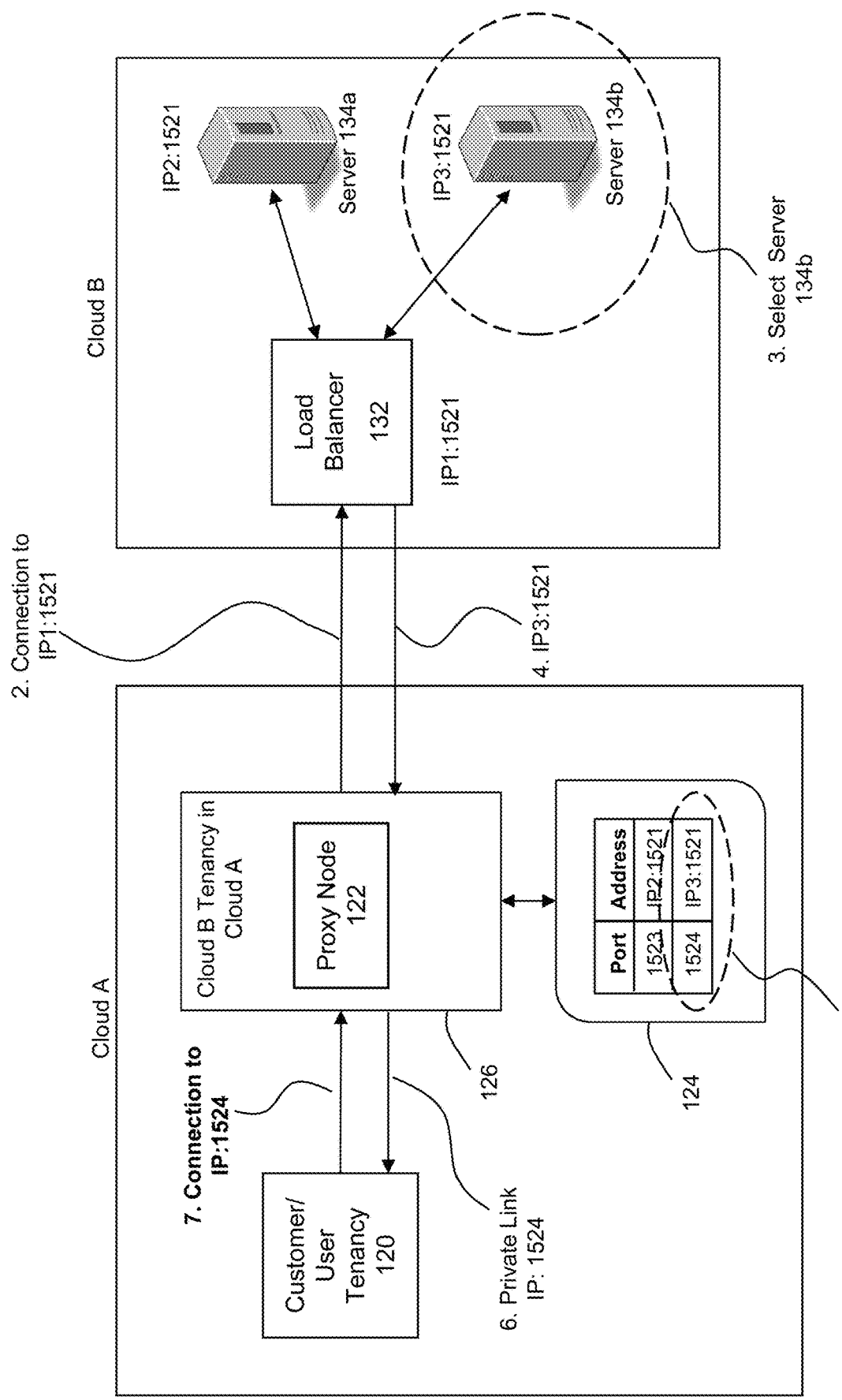
Figure 4I:
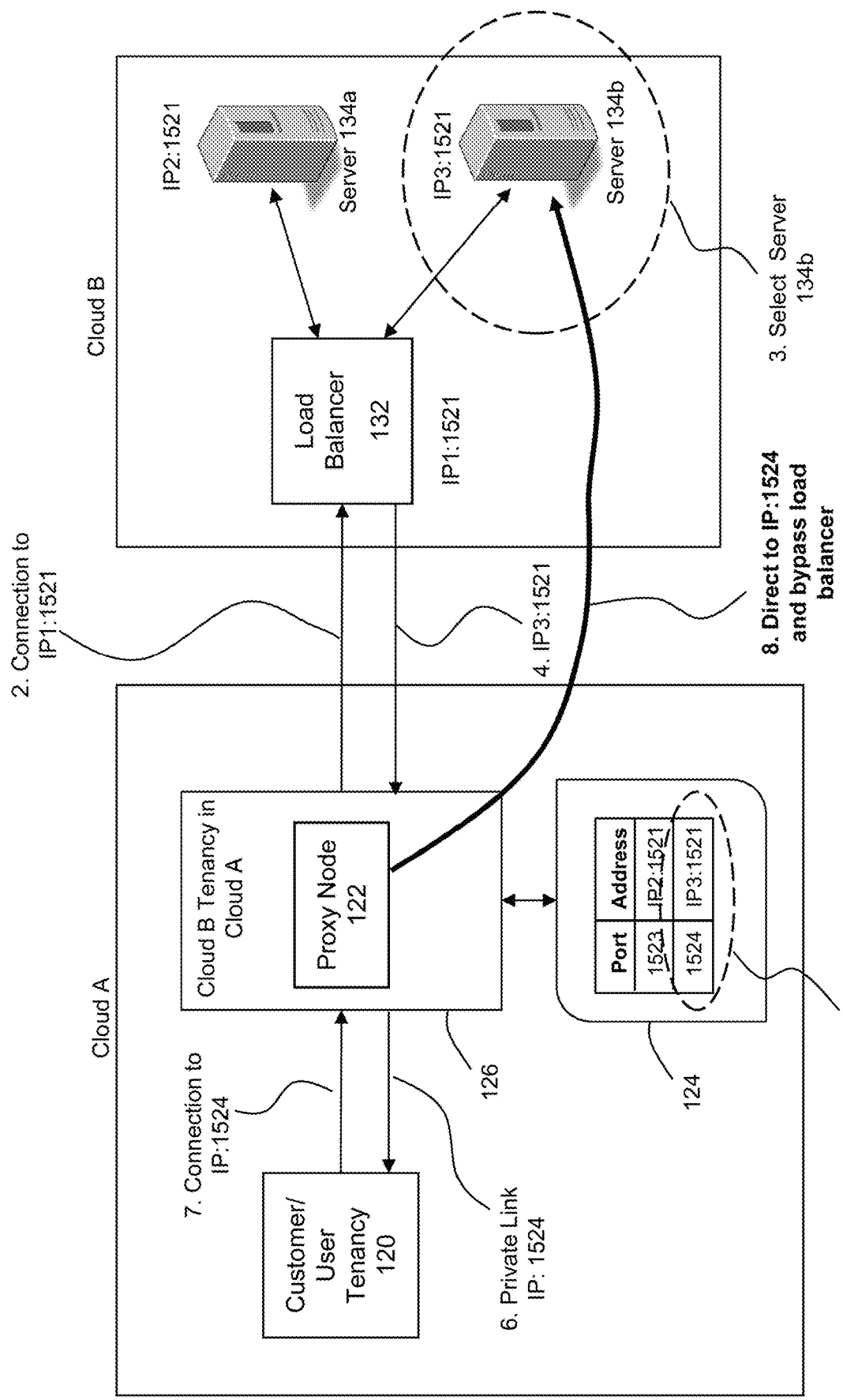

As shown in FIG. 4H (step 7), the client will connect to PLIP:1524. As shown in FIG. 4I (step 8), the traffic generated from the latest communications will reach the server 134b at IP3:1521. The traffic will reach the server 134b, for example, through a route that is maintained at an IP table on the proxy node. It is noted that the traffic does not need to traverse through the load balancer 132 to reach the server 134b.

Figure 5A:
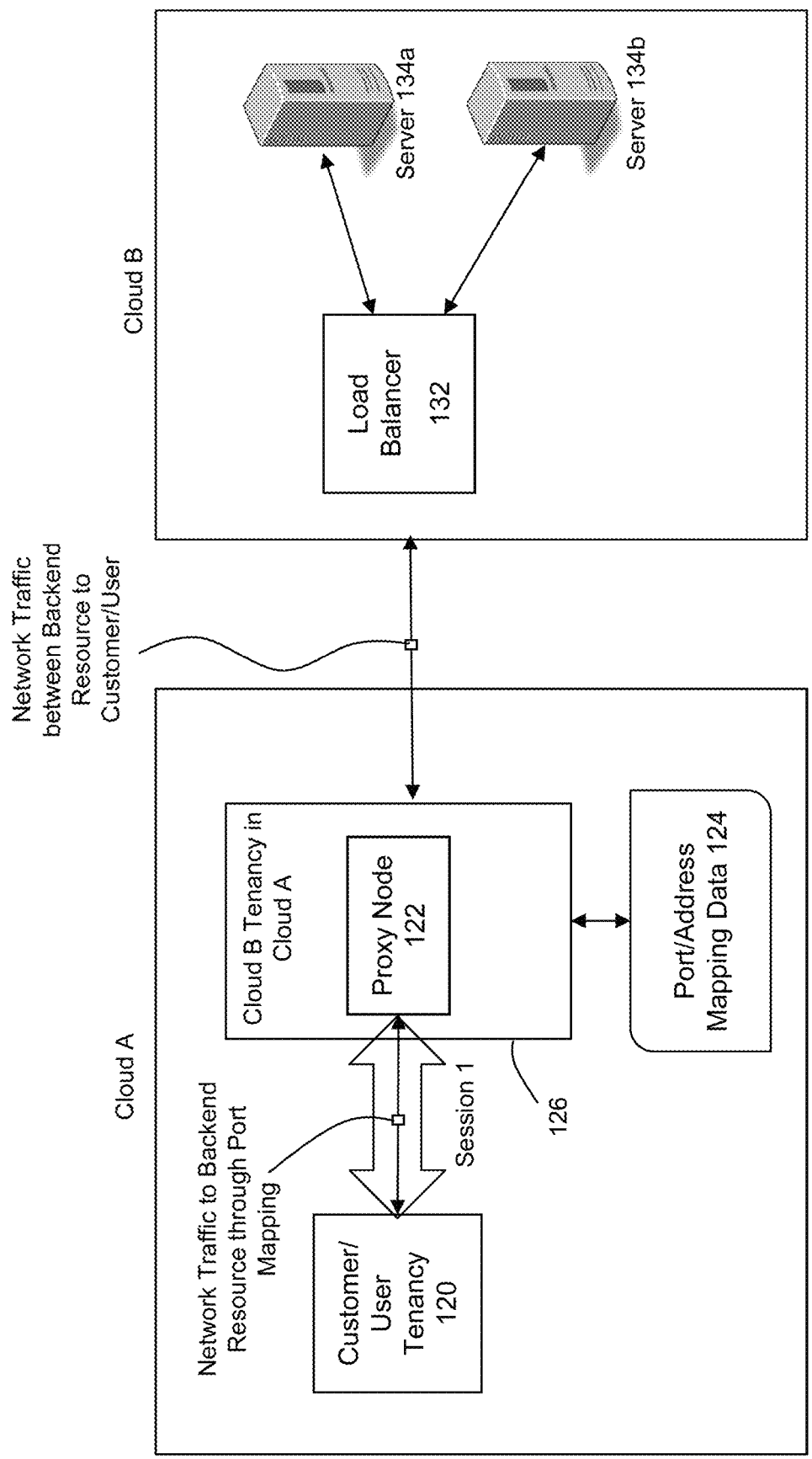
FIG. 5A shows an approach according in some embodiments is to employ a proxy node to implement the redirection processing.

As shown in FIG. 5A, a preferred approach according in some embodiments is to employ a proxy node 122 to implement the redirection processing. With this approach, only a single session 1 is created between the client in the customer tenancy 120 and the proxy node. Subsequent network traffic would be redirected to/from the Cloud B without using a separate session between the proxy node and the Cloud B. In this approach, the traffic from individual servers 134*a* or 134*b* would be sent to the client through the kernel in the node 126.

Figure 5B:
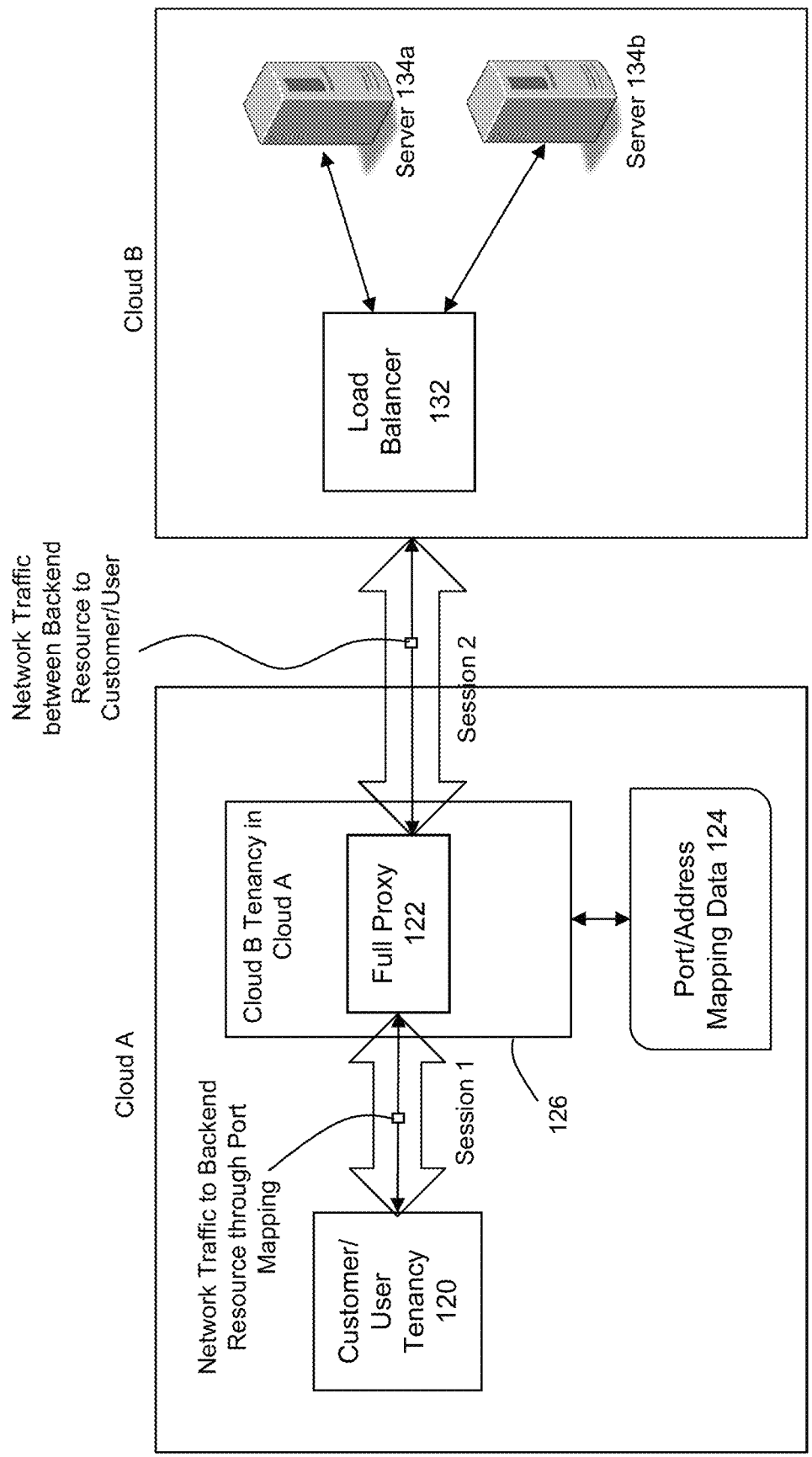
FIG. 5B shows an approach according in some embodiments is to employ a full proxy to implement the redirection processing.

An alternative approach is shown in FIG. 5B, in which a full proxy is implemented at the proxy node. With this approach, in addition to a first session 1 between the client and the proxy, a second session 2 would be established between the proxy and the Cloud B. The traffic would therefore be transmitted through the session 2 when communicating between the proxy and the Cloud B. This approach would also work, but it would need to read each application packet in user space from one end and send to another (rather than just going through the kernel). This approach of FIG. 5B would add latency and also impact throughput as compared to the approach of FIG. 5A. In contrast, with the approach of FIG. 5A, the processing in the proxy process would be out of picture once the connection is established after the redirect.

Figure 6:
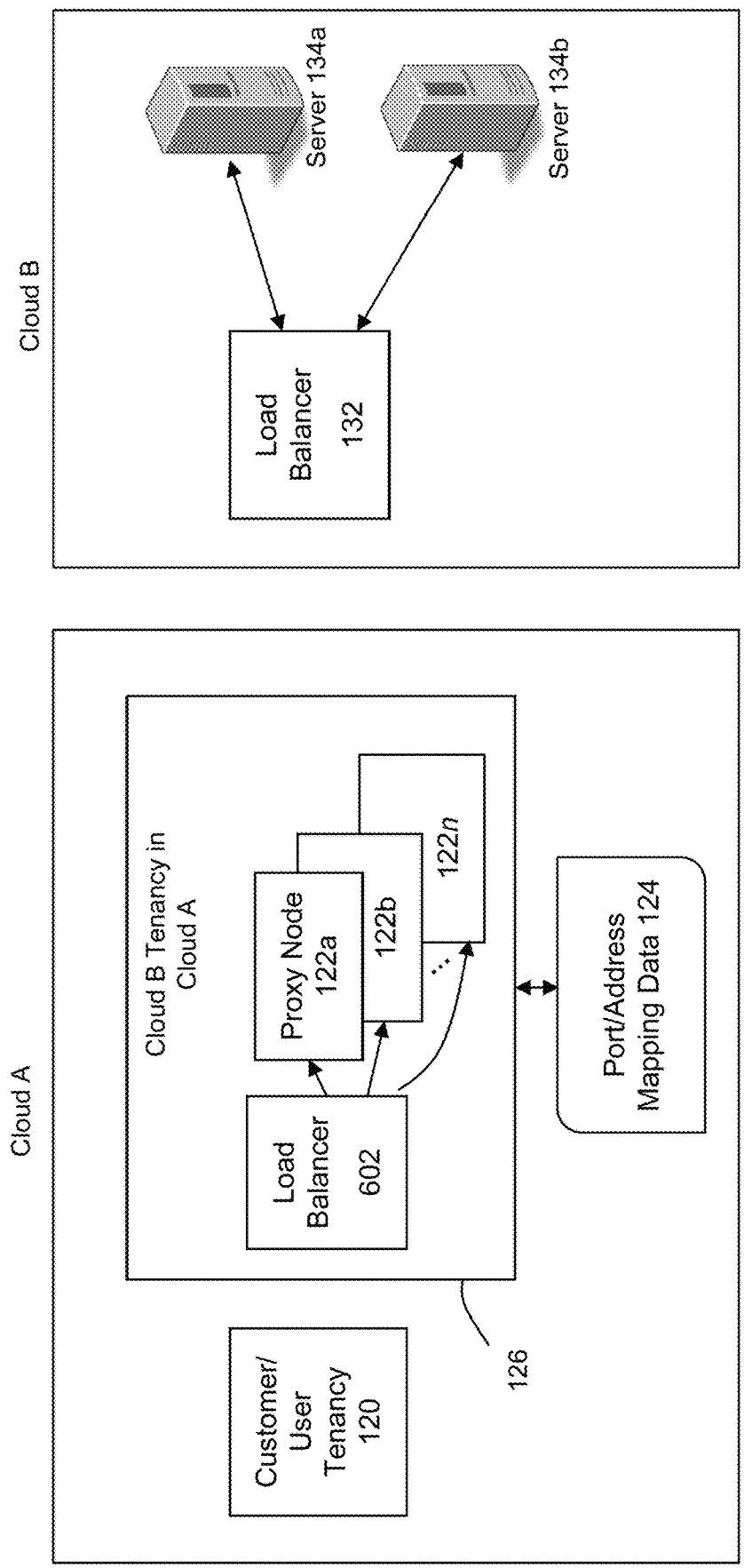
FIG. 6 Shows an approach where as private link terminates at a load balancer.

As shown in FIG. 6, in some embodiments, the private link IP generally terminates at a load balancer 602, and the proxy nodes 122*a-n* in such cases would be the back-end of the load balancer. The dynamic ports in this approach would need to be opened on the load balancer at run time. The proxy node would not get the PLIP in case the connection terminates on the load balancer. The proxy node would need to know the PLIP, and that can be obtained where the appropriate proxy protocol is enabled on the load balancer. Another option is for the application to pass the initial connect string in the payload, and the PLIP can be retrieved from there. It is noted that the mapping data 124 can be established and shared by each of the plurality of proxy nodes 122*a-n*.

Therefore, what has been described is an improved approach to perform redirects between a client in a first cloud to a service in a second cloud. This is advantageously implemented by performing dynamic port mapping at run-time along with adding the routing rules simultaneously to support datalink abstraction for service in the second cloud. When used with a proxy node the solution ensures that after a redirect, the traffic flows through kernel without coming in user space. This approach also allows detection of the private link IP without using proxy protocol which is sent as part of application level connect protocol.

System Architecture

Figure 7:
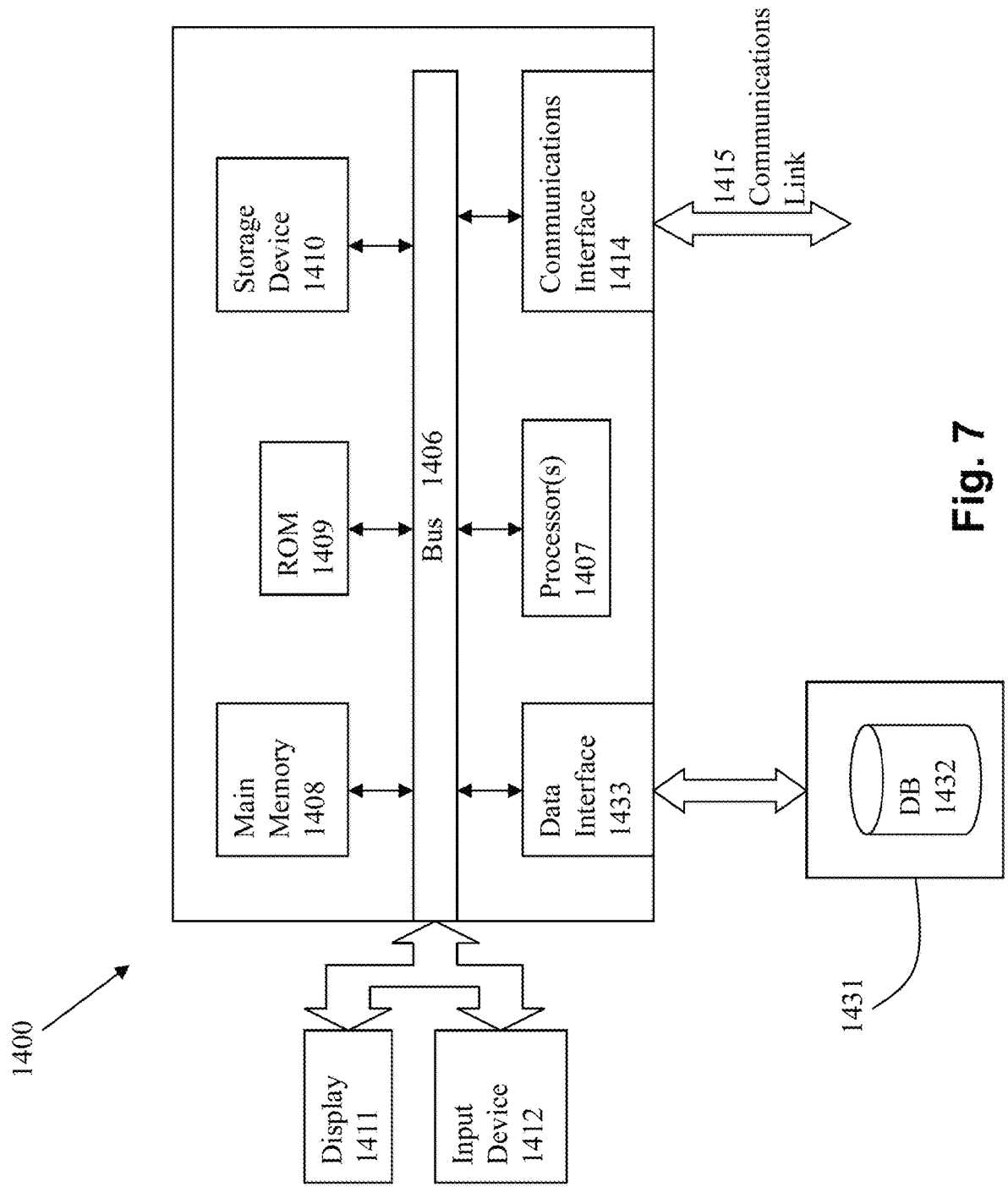
FIG. 7 is a block diagram of an illustrative computing system suitable for implementing an embodiment of the present invention.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to some embodiments of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1410 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A database 1432 in a storage medium 1431 may be used to store data accessible by the system 1400.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 8:
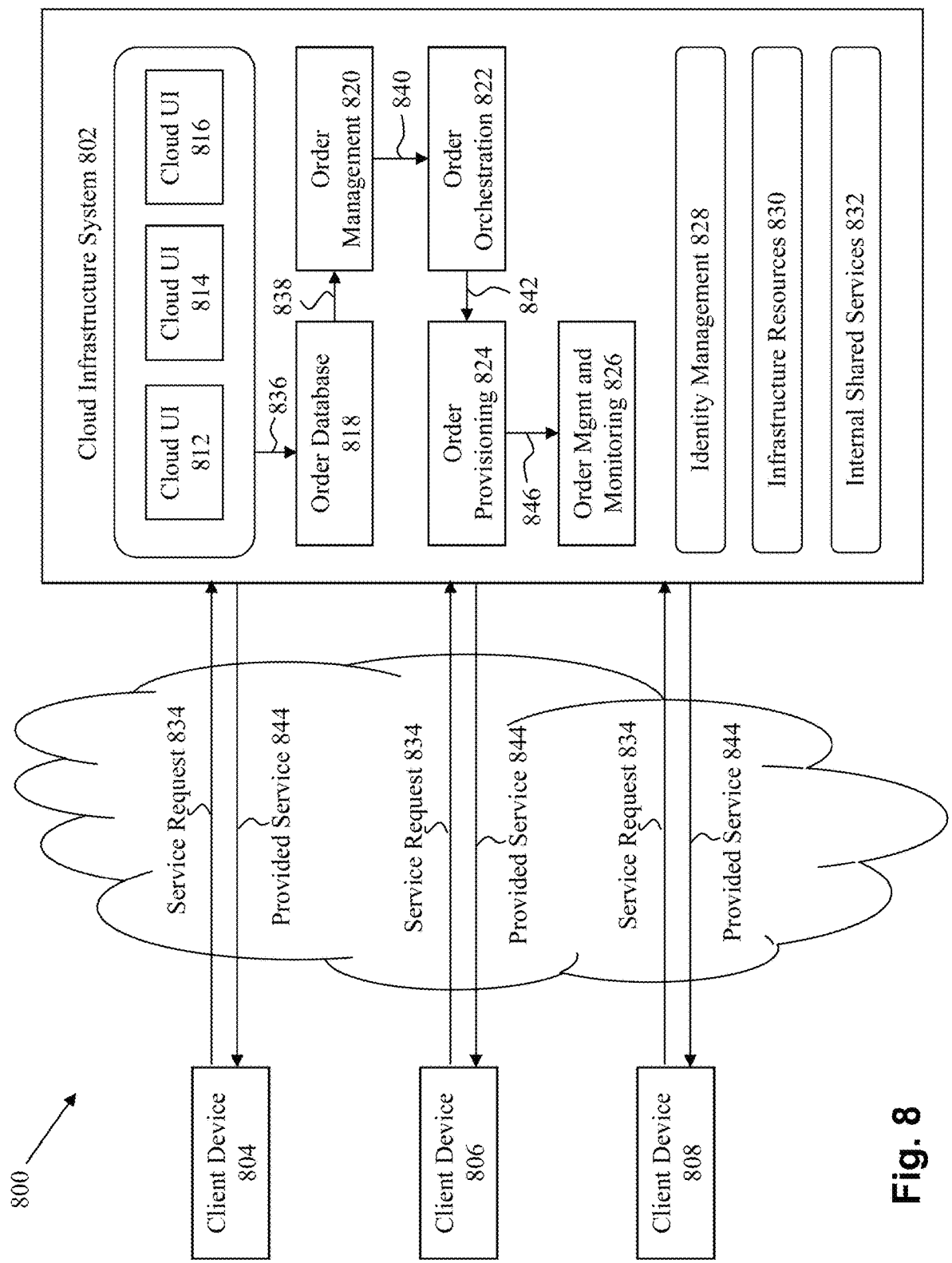
FIG. 8 is a block diagram of one or more components of a system environment in which services may be offered as cloud services, in accordance with an embodiment of the present invention.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for FIG. 7. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method, comprising:
sending a request from a first cloud environment to a second cloud environment via a private link, wherein
the private link is identified with a first address and a fixed port number in the second cloud environment,
a resource in the second cloud environment is selected from a plurality of resources upon receipt of the request to handle the request, and
the resource that is dynamically selected is identified with a second address and the fixed port number in the second cloud environment; and
responsive to selection of the resource from the plurality of resources in the second cloud environment, updating connection information for the private link that connects the first cloud environment to the second cloud environment at least by:
tracking, at the first cloud environment, the selection from the plurality of resources in the second cloud environment for particular requests;
mapping the second address and the fixed port number for the resource in the second cloud environment to a different port number in the first cloud environment; and
redirecting network traffic for the request through the private link between the first cloud environment and the resource in the second cloud environment, using the different port number in the first cloud environment that is mapped to the second address and the fixed port number for the resource in the second cloud environment.

2. The method of claim 1, wherein a route is created for redirecting the network traffic through the private link between the first cloud environment and the resource in the second cloud environment, wherein the route is maintained in a route table or an IP table.

3. The method of claim 1, wherein a mapping table is maintained to map the different port number in the first cloud environment to the second address and the fixed port number associated for the resource in the second cloud environment.

4. The method of claim 1, wherein a proxy node receives at least a portion of the network traffic over the private link in the first cloud environment, and the network traffic from the second cloud environment traverses through kernel space to a client in the first cloud environment.

5. The method of claim 1, wherein a full proxy receives at least a portion of the network traffic over the private link in the first cloud environment, and the network traffic from the second cloud environment traverses through user space in the full proxy to a client in the first cloud environment.

6. The method of claim 1, wherein the network traffic sent from a client in the first cloud environment identifies the different port number when transmitted to the private link.

7. The method of claim 1, wherein a load balancer in the second cloud environment selects the resource from among the plurality of resources, and the second address associated with the resource is redirected from the load balancer to the first cloud environment for mapping in a mapping table.

8. A computer program product embodied on a non-transitory computer usable medium, the non-transitory computer readable medium having stored thereon a sequence of instructions which, when executed by a processor causes the processor to execute actions, the actions comprising:
sending a request from a first cloud environment to a second cloud environment via a private link, wherein
the private link is identified with a first address and a fixed port number in the second cloud environment,
a resource in the second cloud environment is selected from a plurality of resources upon receipt of the request to handle the request, and
the resource that is dynamically selected is identified with a second address and the fixed port number in the second cloud environment; and
responsive to selection of the resource from the plurality of resources in the second cloud environment, updating connection information for the private link that connects the first cloud environment to the second cloud environment at least by:
tracking, at the first cloud environment, the selection from the plurality of resources in the second cloud environment for particular requests;
mapping the second address and the fixed port number for the resource in the second cloud environment to a different port number in the first cloud environment; and
redirecting network traffic for the request through the private link between the first cloud environment and the resource in the second cloud environment, using the different port number in the first cloud environment that is mapped to the second address and the fixed port number for the resource in the second cloud environment.

9. The computer program product of claim 8, wherein a route is created for redirecting the network traffic through the private link between the first cloud environment and the resource in the second cloud environment, wherein the route is maintained in a route table or an IP table.

10. The computer program product of claim 8, wherein a mapping table is maintained to map the different port number in the first cloud environment to the second address and the fixed port number associated for the resource in the second cloud environment.

11. The computer program product of claim 8, wherein a proxy node receives at least a portion of the network traffic over the private link in the first cloud environment, and the network traffic from the second cloud environment traverses through kernel space to a client in the first cloud environment.

12. The computer program product of claim 8, wherein a full proxy receives at least a portion the network traffic over the private link in the first cloud environment, and the network traffic from the second cloud environment traverses through user space in the full proxy to a client in the first cloud environment.

13. The computer program product of claim 8, wherein the network traffic sent from a client in the first cloud environment identifies the different port number when transmitted to the private link.

14. The computer program product of claim 8, wherein a load balancer in the second cloud environment selects the resource from among the plurality of resources, and the second address associated with the resource is redirected from the load balancer to the first cloud environment for mapping in a mapping table.

15. A computer-based system, comprising:
a computer processor to execute a set of program code instructions;
a memory to hold the program code instructions, in which the program code instructions comprises program code which, when executed by the computer processor, causes the computer processor to execute a set of acts, the set of acts comprising:
- sending a request from a first cloud environment to a second cloud environment via a private link, wherein the private link is identified with a first address and a fixed port number in the second cloud environment, wherein
  - a resource in the second cloud environment is selected from a plurality of resources upon receipt of the request to handle the request, and
  - the resource that is dynamically selected is identified with a second address and the fixed port number in the second cloud environment; and
- responsive to a selection of the resource from the plurality of resources in the second cloud environment, updating connection information for the private link that connects the first cloud environment to the second cloud environment at least by:
  - tracking, at the first cloud environment, the selection from the plurality of resources in the second cloud environment for particular requests;
  - mapping the second address and the fixed port number for the resource in the second cloud environment to a different port number in the first cloud environment; and
  - redirecting network traffic for the request through the private link between the first cloud environment and the resource in the second cloud environment, using the different port number in the first cloud environment that is mapped to the second address and the fixed port number for the resource in the second cloud environment.

16. The system of claim 15, wherein a route is created for redirecting the network traffic through the private link between the first cloud environment and the resource in the second cloud environment, wherein the route is maintained in a route table or an IP table.

17. The system of claim 15, wherein a mapping table is maintained to map the different port number in the first cloud environment to the second address and the fixed port number associated for the resource in the second cloud environment.

18. The system of claim 15, wherein a proxy node receives at least a portion of the network traffic over the private link in the first cloud environment, the network traffic from the second cloud environment traverses through kernel space to a client in the first cloud environment.

19. The system of claim 15, wherein a full proxy receives at least a portion of the network traffic over the private link in the first cloud environment, the network traffic from the second cloud environment traverses through user space in the full proxy to a client in the first cloud environment.

20. The system of claim 15, wherein the network traffic sent from a client in the first cloud environment identifies the different port number when transmitted to the private link.

21. The system of claim 15, wherein a load balancer in the second cloud environment selects the resource from among the plurality of resources, and the second address associated with the resource is redirected from the load balancer to the first cloud environment for mapping in a mapping table.

* * * * *

UNITED STATES PATENT AND TRADEMARK OFFICE
CERTIFICATE OF CORRECTION

| | | |
|---|---|---|
| PATENT NO. | : 12,355,836 B2 | Page 1 of 1 |
| APPLICATION NO. | : 18/211172 | |
| DATED | : July 8, 2025 | |
| INVENTOR(S) | : Khan et al. | |

It is certified that error appears in the above-identified patent and that said Letters Patent is hereby corrected as shown below:

On the Title Page

On page 2, Column 1, item [56] under Other Publications, Line 3, delete ".htm," and insert -- .html, --, therefor.

In the Claims

In Column 15, Lines 12-13, in Claim 15, delete "environment, wherein" and insert -- environment, --, therefor.

In Column 15, Line 20, in Claim 15, delete "to a" and insert -- to --, therefor.

Signed and Sealed this
Fourteenth Day of October, 2025

John A. Squires
*Director of the United States Patent and Trademark Office*